United States Patent Office 3,469,966
Patented Sept. 30, 1969

3,469,966
BICYCLIC AMIDES HAVING HERBICIDAL PROPERTIES
Peter E. Newallis, Morris Plains, and Zafarullah K. Cheema, Morristown, N.J., assignors to Allied Chemical Corporation, New York, N.Y., a corporation of New York
No Drawing. Filed Jan. 23, 1967, Ser. No. 610,740
Int. Cl. A01n 9/20; C07c 103/34
U.S. Cl. 71—118                             5 Claims

ABSTRACT OF THE DISCLOSURE

Bicyclic acetamides characterized by the general formula:

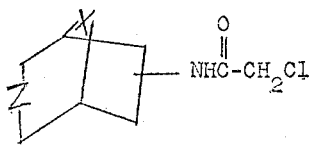

wherein X represents methylene or ethylene and Z represents ethylene or vinylene, which are used as the active ingredients in herbicidal compositions

---

This invention relates to herbicides and it is particularly directed to compositions and methods for killing or otherwise controlling the growth of weeds. Specifically, the invention relates to the use of bicyclic amides, especially 2-(chloroacetamino)-bicyclo-(2.2.1)-heptane and similar bicyclic acetamides having herbicidal properties.

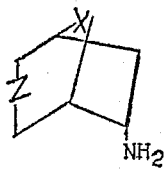

Broadly used, the term "weeds" refers to any plant which persists in growing where it is not desired. In agriculture, weeds pose serious problems: they are responsible for the loss of several billions of dollars per year by ruining grazing land as well as crops. Direct water losses and indirect losses which deter operational efficiency may often be attributed to the growth of weeds in and around drainage and irrigation ditches and canals. The use of chemicals, particularly organic chemicals, over the past few decades has greatly alleviated many of the problems referred to above; however, there is still a great need in the art to produce new herbicidal compositions which will be economically feasible for commercial use.

It is therefore an object of the present invention to provide a new and useful class of herbicides and a method for the use of these new herbicides.

A further object of the present invention is to provide a novel herbicide which will have the desired effect of destroying weeds but, which when used in appropriate amounts, will keep damage to the crops growing adjacent to the weeds minimal.

These and other objects will be obvious from the following description of the invention.

We have found that bicyclic acetamides having the general structure:

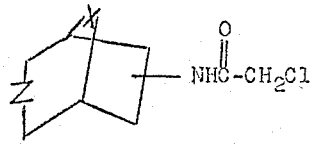

wherein X=methylene or ethylene and Z=ethylene or vinylene, may be used as the active ingredients in the preparation of herbicidal compositions.

The compounds which fall within the scope of the present invention include:

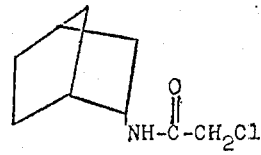

(1) 2-(chloroacetamino)-bicyclo-(2.2.1)-heptane

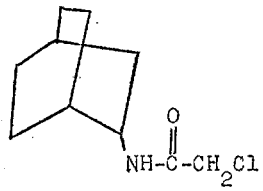

(2) 2-(chloroacetamino)-bicyclo-(2.2.2)-octane

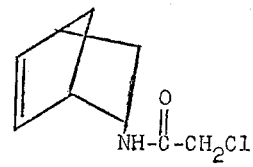

(3) 5-(chloroacetamino)-bicyclo-(2.2.1)-2-heptene

The preparation of these compositions is disclosed in U.S. Patents 2,912,459 and 2,926,172. Generally, these compounds may be prepared by the following equation:

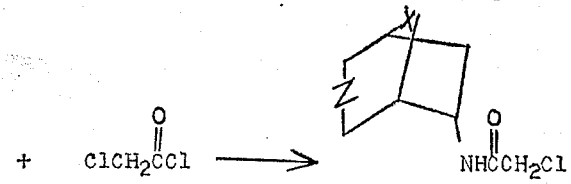

This process involves the preparation of bicyclic acetamides by reacting suitable bicyclic amines with haloacyl halides. Acylation of the amine is preferably performed in the presence of an acid neutralizing agent such as a liquid organic base; for example, pyridine, collidine or lutidine. Also suitable for this purpose are the alkali metal carbonates, for example sodium carbonate or potassium hydrogen carbonate. Although the organic base may also function as a diluent, other solvents such as benzene, toluene or hexane may be used for that purpose. The reaction may be carried at elevated temperatures; however, most satisfactory yields are obtained at room temperature, 20° C. to 25° C., or below.

The following examples are illustrative of the preparation of the compounds used in the herbicidal compositions of the invention.

EXAMPLE 1

12.0 grams of chloroacetylchloride were dissolved in 50 ml. of dry ether and added with stirring and cooling to a solution of 11.0 grams of 2-endo-aminobicyclo (2.2.1) heptane and 10 ml. of pyridine in 80 ml. of dry ether. The temperature was kept under 10° C. during the addition of the chloroacetylchloride. The reaction mixture was stirred for an additional ½ hour, then filtered and washed with water, with dilute hydrochloric acid and then again with water. After drying over magnesium sulfate, the ether was flash evaporated and 6.5 grams of 2-endo - (chloracetamino) - bicyclo (2.2.1)-heptane were crystallized from ethyl acetate.

EXAMPLE 2

20 grams of 2-endo-aminobicyclo (2.2.2)-octane was dissolved in 100 ml. of benzene with 13.7 ml. of pyridine. A solution of 12 ml. of chloroacetylchloride in 100 ml. of benzene was added dropwise over a 30 minute period during which the temperature was kept below 5° C. The mixture was stirred at 0° C. for two more hours after which it was filtered. The filtrate was washed with 10% hydrochloric acid, with 5% sodium bicarbonate and then with water. After drying over magnesium sulfate, the solvent was evaporated and 10.0 grams of 2-endo-(chloroacetamino)-bicyclo (2.2.2)-octane remained.

EXAMPLE 3

8.0 grams of 5-endo-aminobicyclo (2.2.1)-2-heptene were dissolved in 50 ml. of dry benzene and 8.0 grams of dry pyridine were added. The resulting solution was chilled in an acetone-Dry Ice bath to $-10°$ C. at which time 8.3 grams of chloroacetylchloride in 100 ml. of benzene were slowly added to the mixture with vigorous stirring while the temperature was maintained below 5° C.; after all the chloroacetylchloride was added, the mixture was stirred for another 30 minutes at this temperature. The mixture was then removed from its acetone bath and stirred for an additional 2 hours. After filtering, the filtrate was washed twice with water, then with dilute hydrochloric acid, with 2% sodium bicarbonate and then twice again with water. After drying, the solvent was flash evaporated and 3.0 grams of 5-endo-(chloroacetamino)-bicyclo (2.2.1)-2-heptene were recrystallized in pentane.

As mentioned above, the bicyclic acetamides of the present invention possess excellent ability to inhibit the growth of or to destroy vegetation by adding thereto, or by applying to the locus in which the vegetation is growing or is to grow, herbicidal compositions containing these compounds as the active ingredients.

The compounds of the present invention have a distinct advantage when used as herbicides in that they can be used for both monocotyledonous or grassy plants and dicotyledonous or broad-leaf varieties of weeds depending upon the stage of growth at which they are applied. In either case the use of these compounds as herbicides produces a minimal amount of crop injury. As will be shown in the examples below, amounts of as little as 2 pounds of active ingredient per acre when applied as a pre-emergence herbicide will give an 80% kill. If the same compounds are applied in an amount of 16 pounds per acre under the same conditions they will give a 100% kill. When applied as post-emergence herbicides the compounds of the present invention produce similar results on the dicotyledonous variety of weed.

These bicyclic acetamides may also be used to provide complementary rapid herbicidal action when used in combination with slower acting herbicides.

The use of herbicidal compositions containing bicyclic acetamides as active ingredients as well as a carrier for the active ingredient are also included within the scope of the invention. Thus the composition can either be a liquid composition obtained by dissolving or dispersing the active ingredient in a suitable liquid diluent, as water or an organic liquid, or it may be in the form of a powder in which active ingredient is in admixture with a powder diluent. The compositions of the present invention may also contain wetting, dispersing or emulsifying agents which act as surface active agents and which will facilitate their use as spray compositions. These herbicidal compositions may also contain any other type of substance known to the art as being suitable as an adjuvant, this category would include such substances as stickers, binders, corrosion inhibitors and coloring agents.

It is obvious from the results of the tests which follow that the amount of active ingredient which is used in the herbicidal compositions of the present invention will result in a variety of effects from minimal injury to an almost general kill of the entire monocotyledonous or dicotyledonous population. For this reason it is important to formulate a herbicidal composition so as to permit a uniform pre-determined application of active ingredient to the leaves or soil surfaces so as to produce the desired effect. By properly selecting and proportioning various conditioning agents either liquid or solid formulations can be prepared. The desired herbicidal result can be obtained by treating the plant or soil in any conventional manner.

Solid compositions are usually in the form of dusts and are compounded to give a homogeneous free-flowing dust by admixing the active with finely-divided solids. It is preferable to avoid any hygroscopic materials unless the compositions also contain a separate substance to serve as an aid to the flowability. Suitable solid diluents would include talcs, natural clays, pyrophyllite, diatomaceous earth or flours such as walnut shell, wheat, redwood, soya bean, cotton-seed flours and other inert solid conditioning agents or carriers known in the art. These diluents may represent a substantial portion, that is 50–98% by weight, of the entire formulation as supplied to the plant or the soil. More concentrated herbicides may require dilution before use so that the soil may be properly conditioned for more effective usage. If the solid herbicidal compositions are used in their concentrated form, it is desirable that they be mixed with the surface soil by means of a disk-plow or a harrow at the time of application.

If the herbicidal composition is to be used in a liquid form, the liquid diluent may be a solvent for the active ingredient or the active ingredient may be dispersed in the liquid diluent. Typical liquid diluents include fuel oils, petroleum naphthas and the like. The solutions or dispersions should contain the active ingredient in an amount not less than ½ pound per 100 gallons of dispersion or solution, the more usual concentrations are in the range of 1–2 pounds per 100 gallons of dispersion or solution.

As mentioned above, the herbicidal activities of the compounds of the present invention may be improved by the addition of surface active agents which would act to provide uniform dispersions of all formulation components of both solids and liquid types. This surface active agent may be anionic, cationic or non-ionic and may include conventional soaps such as the water soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophillic and hydrophobic functions so as to enable the mixing of otherwise immiscible ingredients. Generally, the surface active agents will represent only a minor portion of the herbicidal composition used, usually less than 10% by weight and frequently as low as 0.05%.

The herbicidal compositions of the present invention are applied either in a spray, granule, pellet, or dust form to the locus or area to be treated using any one of the conventional types of spraying or dusting apparatus. Depending upon the desired results and the specific weeds to be killed, the compositions can be applied during the period of weed infestation thus destroying the weeds, or the application may be made in advance of an anticipated weed infestation thus preventing undesired growth. Compositions can be applied as aqueous foliar sprays or as sprays directly to the surface soil. Alternatively, the dried powder compositions can be dusted directly on the plants or on the soil. Application of granules is an effective method for obtaining pre-emergence control of weeds with minimum injury to the foilage of desired growing plants. In another case, application of granules, either manually or by machine, is an effective method for obtaining complete kill of undesired brush growth in fence rows, under power lines, etc.

The following illustrates the herbicidal activity of 2-endo-(chloroacetamino)-bicyclo (2.2.1)-heptane, a compound which is representative of the compositions used in the present invention.

A test plot was covered with rye, a representative of the monocotyledonous varieties of grass and with rape, a dicotyledonous plant, as well as with corn and wheat, representatives of crop plants.

A pre-emergence test was performed by treating two flats which had been treated for one day with 2-endo-(chloroacetamino)-bicyclo (2.2.1)-heptane at a rate equivalent to 16 pounds of active ingredient per acre. The treated flats were placed in the greenhouse, watered by sub-irrigation and held for a 16 day observation period after which they were rated. Similar tests were performed using amounts of the herbicide equivalent to 4 and 2 pounds per acre.

These pre-emergence tests showed that 2-endo-(chloroacetamino)-bicyclo (2.2.1)-heptane had excellent control over the monocotyledonous rye grass with limited control in high concentrations over the dicotyledonous rape.

Eight to ten days after seeding, post-emergence tests were performed by treating two flats with a herbicide containing active ingredient equivalent to 16 pounds per acre in a manner similar to that of the pre-emergence tests. After 10 to 12 day observation period, it was found that 2-endo-(chloroacetamino)-bicyclo (2.2.1)-heptane exhibited excellent control over the dicotyledonous rape when applied in high concentrations. It was further found that as a post-emergence herbicide, 2-endo-(chloroacetamino)-bicyclo (2.2.1)-heptane had no effect on such monocotyledonous varieties as rye. Thus, for example, at this point of growth, the active ingredient could be applied to a crop of rye and it would destroy all the dicotyledonous plants while leaving the actual crop untouched.

The actual results of these tests are shown in the following table wherein the figures 0–100 represent the percent of plants killed or absent as compared to the untreated check plot.

| 2-endo-(chloroacetamino)-bicyclo (2.2.1)-heptane | Rye | Rape | Corn | Wheat |
|---|---|---|---|---|
| Pre-emergence: | | | | |
| 16 lbs | 100 | 20 | 0 | 20 |
| 4 lbs | 90 | 0 | 0 | 20 |
| 2 lbs | 80 | 0 | 0 | 10 |
| Post-emergence, 16 lbs | 0 | 100 | 0 | 0 |

A further pre-emergence test was performed on three weed species, crabgrass, *Digitaria sanguinalis*, Johnson grass, *Sorghum halepense*, and wild oats, *Uvularia sessifolia* by planting them separately in three peat pots. Two pots of each species were planted and placed in a metal tray and treated in the same manner as for the general pre-emergence test using 16 lbs. per acre. In this case it may be seen that 2-endo-(chloroacetamino)-bicyclo (2.2.1)-heptane exhibits excellent control over these three specific weeds. The actual results indicate a 99% kill of both the Johnson grass and crabgrass with a 90% kill of the wild oats.

Tests performed on the other compounds used in the present invention gave similar satisfactory results as to their herbicidal activity.

Since various changes and modifications may be made without departing from the spirit thereof, the invention is to be taken as limited by the scope of the appended claims.

We claim:
1. A process for inhibiting the growth of vegetation, which comprises treating said vegetation with an herbicidal amount of a bicyclic acetamide of the general formula:

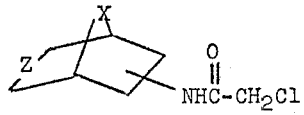

wherein X is methylene or ethylene and Z is ethylene or vinylene.

2. A process for inhibiting the growth of vegetation as claimed in claim 1 wherein said vegetation is treated with at least about 2 pounds of bicyclic acetamide per acre.

3. A process for inhibiting the growth of vegetation as claimed in claim 2 wherein said bicyclic acetamide is 2-(chloroacetamino)-bicyclo-(2.2.1)-heptane.

4. A process for inhibiting the growth of vegetation as claimed in claim 2 wherein said bicyclic acetamide is 2-(chloroacetamino)-bicyclo-(2.2.2)-octane.

5. A process for inhibiting the growth of vegetation as claimed in claim 2 wherein said bicyclic acetamide is 5-(chloroacetamino)-bicyclo-(2.2.1)-2-heptene.

References Cited
UNITED STATES PATENTS

| 3,221,067 | 11/1965 | Mark | 260—648 |
| 3,154,400 | 10/1964 | Hamm | 71—118 |
| 3,133,808 | 5/1964 | Hamm | 71—118 |
| 2,912,459 | 11/1950 | Boehme | 260—561 |

LEWIS GOTTS, Primary Examiner

CATHERINE L. MILLS, Assistant Examiner

U.S. Cl. X.R.

71—127